United States Patent [19]

Boothe

[11] 4,054,178
[45] Oct. 18, 1977

[54] GARDEN TOOL WITH ADJUSTABLE LENGTH TINES

[76] Inventor: Ferron Boothe, P. O. Box G/415 Beach 43rd St., Far Rockaway, N.Y. 11691

[21] Appl. No.: 721,186

[22] Filed: Sept. 8, 1976

[51] Int. Cl.² .......................... A01B 1/14; A01D 7/06
[52] U.S. Cl. ................................ 172/374; 56/400.18; 172/379; 403/104; 403/373; 403/377
[58] Field of Search ............... 172/372, 373, 374, 379, 172/380, 378; 56/400.16, 400.17, 400.18, 400.19, 400.20, 400.21; 403/343, 361, 377, 104, 373

[56] References Cited

U.S. PATENT DOCUMENTS

| 563,281 | 7/1896 | Kuehl | 172/373 X |
| 574,555 | 1/1897 | Minton | 172/378 X |
| 1,780,748 | 11/1930 | Fisher | 56/400.21 X |
| 3,380,097 | 4/1968 | Pharris | 403/343 X |
| 3,781,908 | 12/1973 | Tullos | 403/104 X |
| 3,826,034 | 7/1974 | Herek | 403/361 X |

FOREIGN PATENT DOCUMENTS

| 50,799 | 11/1911 | Austria | 56/400.21 |
| 28,886 | 7/1957 | Finland | 403/361 |
| 746,793 | 3/1933 | France | 403/343 |

Primary Examiner—Richard T. Stouffer
Attorney, Agent, or Firm—Allen D. Brufsky

[57] ABSTRACT

A gardening tool that includes a handle portion having a plurality of tines depending therefrom and a second plurality of tines of shorter length, which are adjustable in alternating arrangement with the longer tines. Each tine of the second plurality of tines includes two telescoping portions surrounded by a clamp with a variably tapered internally threaded section. The variable taper within the clamp facilitate the clamping together of the two telescoping portions of the tine.

7 Claims, 2 Drawing Figures

GARDEN TOOL WITH ADJUSTABLE LENGTH TINES

BACKGROUND OF THE INVENTION

This invention relates to a gardening tool; more particularly to one that has a plurality of tines of different lengths some of which are telescopically adjustable, thereby providing for a desired length depending upon the nature of the job.

The prior art teaches a variety of gardening tools, for example as disclosed in U.S. Pat. Nos. 855,547; 1,170,698; 1,277,998; 1,696,678; 1,833,489; 2,279,747; 2,710,571; 2,787,945; 3,232,355 and others.

SUMMARY OF THE INVENTION

It is accordingly an object of the instant invention to provide for a new and improved garden tool It is another object to provide for a garden tool having a plurality of tines some of which are adjustable in length.

It is a further object to provide for the same at relatively little cost thereby making it generally available.

These and other objects and advantages of the invention will become more apparent from a consideration of the following detailed disclosure and claims and by reference to the accompanying drawings, in which:

FIG. 1 is a top plan view; and
FIG. 2 is a sectional view of one adjustable tine.

Broadly speaking, the instant invention includes the provision of a gardening tool, comprising a handle portion, a plurality of first tines having a predetermined length depending therefrom, a plurality of second tines depending from the handle, the second tines being variously disposed between the first tines, at least some of the second tines including two portions, a first portion being hollow and having a predetermined internal diameter, the second portion having an external diameter lesser than the internal diameter, the second portion being telescopically disposed for movement in the first portion for varying the length thereof, means disposed on the second tines for arresting the telescopic movement.

DETAILED DESCRIPTION OF THE PREFERRED EMBODIMENT

Figure 1:
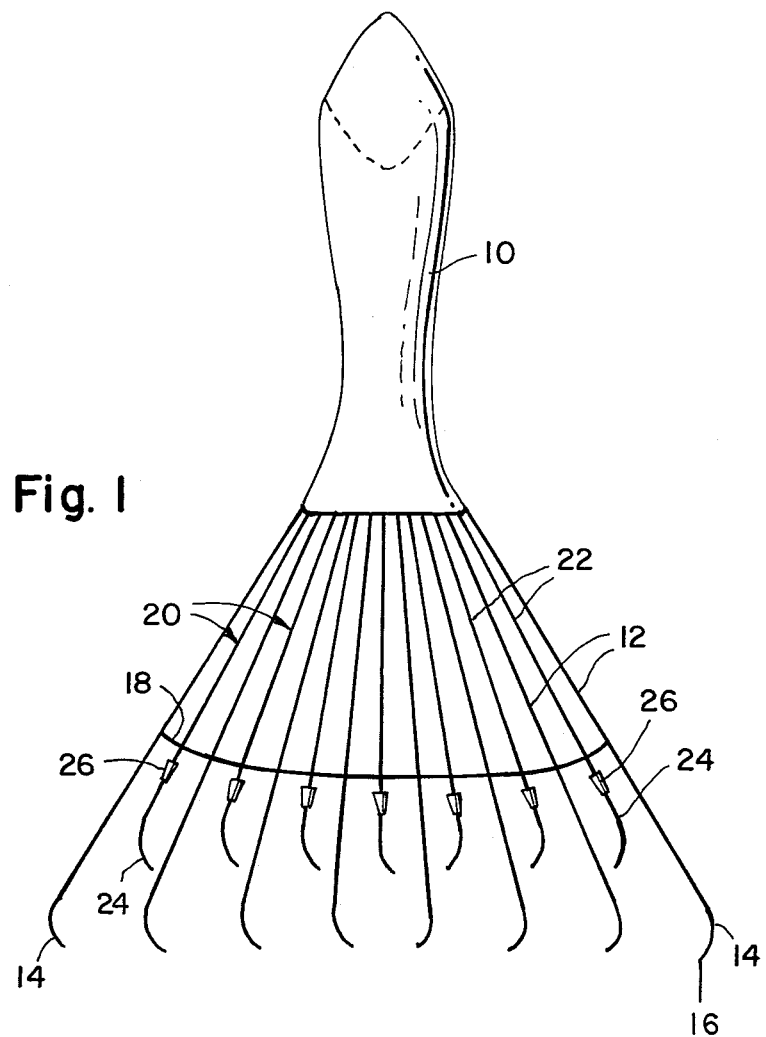
Figure 2:
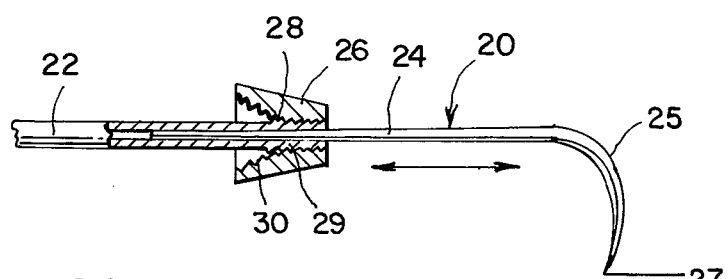

Referring more particularly to the drawings, there is shown a garden tool that includes a handle portion 10 that may be hollow thereby providing for light weight. Depending from the distal end of the handle 10 are a first plurality of metal tines 12 that are in spaced apart relation and are generally of the same length and about 3/16 in diameter, with a hooked or curved distal end 14 that is preferably beveled and pointed at 16; the distal end will preferably define a radius of about ⅜ inch. The tines 12 are generally constructed of a flexible metal, such that there is provided ease of working the same. A strengthening bar or support member 18 is disposed transverse the longitudinal axis of the tines 12 and in contact therewith, at about the midway point along the length of the tines 12. A plurality of second tines 20 are also disposed depending from the handle 10, with at least one of said second tines 20 in alternating arrangement with said first tines 12. The second tine 20 is of a length shorter than the first tine 12, at least some of said second tines 20 are telescopically adjustable such that the length thereof may be varied. The foregoing is accomplished by providing for a first hollow member 22 depending from the handle 10. The member 22 has a predetermined internal diameter that is larger than the external diameter of a second member 24 that mates therewith in telescopic arrangement such that member 24 moves into and out of the member 22. Members 24 each have a hooked or curved distal end 25 which is pointed at 27. Means 26 are provided on the tine 20 for locking the length of the tine 20. The means include a rotating clamp that defines a central bore 28 through which the tine 20 passes, the bore being in contact with both members 22, 24 and being adapted to frictionally engage the same. The central bore 28 threadably engages external threads 29 of the first member 22 by a plurality of internal threads 30. The threads 30 are variably tapered as illustrated to facilitate the clamping of the member 24 by the clamp means 26. In the preferred embodiment, all of the second tines 20 will be adjustable in length, and there will be one second tine 20 disposed in alternating arrangement between a pair of first tines 12. The distal ends of the second tines 20 may also be pointed and beveled.

Since it is obvious that numerous changes and modifications can be made in the above-described details without departing from the spirit and nature of the invention, it is to be understood that all such changes and modifications are included within the scope of the invention.

I claim:

1. A gardening tool, comprising a handle portion, a plurality of first tines having a predetermined length depending therefrom, a plurality of second tines depending from said handle, said second tines being variously disposed between said first tines, at least some of said second tines including two portions, a first portion being hollow and having a predetermined internal diameter $\omega$, said first portion being provided with external threads disposed thereabout, said second portion having an external diameter lesser than said internal diameter, said second portion being telescopically disposed for movement in said first portion for varying the length thereof, means disposed on said second tines for arresting the telescopic movement, said means including a rotatable clamp defining a central bore through which said second tine passes, said central bore being provided with a variably tapered internally threaded section for threadably engaging said external threads disposed about said first portion the degree of narrowing of the taper of said internally threaded section varying substantially from one end thereof to the other, so as to facilitate clamping of the second portion in place with respect to the first portion.

2. The tool as defined in claim 1 further including a member transverse to the longitudinal axis of said tines and contacting the same.

3. The tool as defined in claim 1 wherein at least some of said tines are flexible.

4. The tool as defined in claim 1 wherein said second tines are disposed in alternating arrangement.

5. The tool as defined in claim 1 wherein all of said second tines are telescopic.

6. The tool as defined in claim 1 wherein said second tines in the normally extended position are shorter than said first tines.

7. The tool as defined in claim 1 wherein at least some of said tines have a hooked distal end portion.

* * * * *